(12) United States Patent
Tordesillas et al.

(10) Patent No.: US 11,555,942 B2
(45) Date of Patent: Jan. 17, 2023

(54) METHOD FOR PREDICTION OF A SURFACE EVENT

(71) Applicant: THE UNIVERSITY OF MELBOURNE, Melbourne (AU)

(72) Inventors: Antoinette Tordesillas, Melbourne (AU); Robin Batterham, Melbourne (AU)

(73) Assignee: The University of Melbourne, Melbourne (AU)

( * ) Notice: Subject to any disclaimer, the term of this patent is extended or adjusted under 35 U.S.C. 154(b) by 551 days.

(21) Appl. No.: 16/606,453

(22) PCT Filed: Apr. 24, 2018

(86) PCT No.: PCT/AU2018/050376
§ 371 (c)(1),
(2) Date: Oct. 18, 2019

(87) PCT Pub. No.: WO2018/195596
PCT Pub. Date: Nov. 1, 2018

(65) Prior Publication Data
US 2020/0132881 A1 Apr. 30, 2020

(30) Foreign Application Priority Data

Apr. 24, 2017 (AU) ................. 2017901479

(51) Int. Cl.
*G06N 5/04* (2006.01)
*G08B 31/00* (2006.01)
*G01V 99/00* (2009.01)

(52) U.S. Cl.
CPC ............. *G01V 99/005* (2013.01); *G06N 5/04* (2013.01)

(58) Field of Classification Search
CPC ........ G01V 99/005; G01V 99/00; G06N 5/04; G08B 31/00
See application file for complete search history.

(56) References Cited

U.S. PATENT DOCUMENTS

2014/1569915    6/2014   Hong et al.

FOREIGN PATENT DOCUMENTS

AU    2012 101 711 A4    12/2012
WO    WO 02/46790 A1     6/2002
(Continued)

OTHER PUBLICATIONS

Gorsevski et al., Landslide Detection and Susceptibility Mapping Using LiDAR and an Artificial Neural Network Approach: A Case Study in the Cuyahoga Valley National Park, Ohio, Published Online: May 22, 2015, Landslides 13, pp. 467-484 (Year: 2015).*

(Continued)

*Primary Examiner* — Toan M Le
(74) *Attorney, Agent, or Firm* — Knobbe, Martens, Olson & Bear, LLP (57) ABSTRACT

Methods and systems for predicting surface failure of a surface, for example a method comprising the steps of: obtaining a group of measured datasets, each including: a measurement value of at least a first type for each of a plurality of grid elements, each grid element associated with a location on the surface; and a time value, such that the group of datasets includes datasets associated with a plurality of unique time values, identifying an interface set of grid elements for each measured dataset, each interface set comprising grid elements of the associated measured dataset meeting a connection threshold according to a connection rule in dependence on the measurement values of the grid elements, determining a risk of surface failure in accordance with identification of a pattern of grid elements of the (Continued)

interface set which has a persistent location with respect to the surface of interface sets over a plurality of measured datasets.

20 Claims, 6 Drawing Sheets (56) References Cited

FOREIGN PATENT DOCUMENTS

WO     WO 2012/089539 A1     7/2012
WO     WO 2017/020077 A1     2/2017

OTHER PUBLICATIONS

International Search Report dated Jul. 11, 2018 in International Application No. PCT/AU2018/050376, in 4 pages.
Written Opinion dated Jul. 11, 2018 in International Application No. PCT/AU2018/050376, in 6 pages.
"Closeness centrality," retrieved from internet on Oct. 15, 2019, https://en.wikipedia.org/wiki/Closeness_centrality, in 4 pages.
Kannan et al., "A Review of Outlier Prediction Techniques in Data Mining," *Research Journal of Applied Sciences, Engineering and Technology*, 10(9):1021-1028, 2015.
Martínez-Álvarez, "Clustering preprocessing to improve time series forecasting," *AI Communications*, 24 (2011), pp. 97-98.
Extended European Search Report issued in Application No. 18789941.4 dated Dec. 9, 2020.

* cited by examiner

METHOD FOR PREDICTION OF A SURFACE EVENT

CROSS REFERENCE TO RELATED APPLICATIONS

The present application is a U.S. national phase application under 35 U.S.C. § 371 of International Application No. PCT/AU2018/050376, filed on Apr. 24, 2018 and published as WO 20181195596 A1 on Nov. 1, 2018, which claims priority to AU Application No. 2017901479, filed on Apr. 24, 2017. The content of each of these applications is incorporated herein by reference in its entirety.

FIELD OF THE INVENTION

The invention generally relates to detecting events such as landslides.

BACKGROUND TO THE INVENTION

Surface failures, such as land and mud slides, avalanches, rockfalls and failures of retaining walls and dams as well as slips in mines and other geological surfaces are unfortunately common place. The impact is often devastating and costly. Geomaterials (i.e., rock, soil and snow) are at the heart of these failure events.

SUMMARY OF THE INVENTION

According to an aspect of the present invention, there is provided a method for predicting surface failure of a surface, the method comprising the steps of: obtaining a group of measured datasets, each including: a measurement value of at least a first type for each of a plurality of grid elements, each grid element associated with a location on the surface; and a time value, such that the group of datasets includes datasets associated with a plurality of unique time values, identifying an interface set of grid elements for each measured dataset, each interface set comprising grid elements of the associated measured dataset meeting a connection threshold according to a connection rule in dependence on the measurement values of the grid elements, determining a risk of surface failure in accordance with identification of a pattern of grid elements of the interface set which has a persistent location with respect to the surface of interface sets over a plurality of measured datasets.

Optionally, the method further comprises the steps of: for each dataset, constructing a network of nodes, wherein each node is uniquely associated with a grid element, and in which two nodes are assigned a connection according to a connection criterion, wherein the grid elements of the interface set of grid elements are determined in accordance with identification of a set of nodes having a closest connection to all other nodes. A predetermined number of nodes may be identified for inclusion within the set of nodes. The step of constructing a network of nodes may include: connecting each node to k other nodes in accordance with a node connection rule on the basis of a closeness in a measurement value between the node to the k other nodes, wherein k is selected in accordance with a minimum number of connections for each node that provides a connected network. The step of constructing a network of nodes may include: determining, for each node, a closeness centrality for the node; and identifying a predetermined number of nodes for the set of nodes having largest closeness centralities. The predetermined number may be between 10% and 30% of the total number of nodes. The step of constructing a network of nodes may include: determining, for each node, a closeness centrality for the node; and generating a plurality of candidate interface sets, wherein the interface set is selected from one of the plurality of candidate interface sets. The interface set may be selected as having a pattern of grid elements best matching a pattern associated with a risk of surface failure.

Optionally, for the or each node i, the closeness centrality Cc is determined according to the following equation $$C_c(i) = \frac{N-1}{\sum_{j \neq i} L(i,j)}$$

where N is the total number of nodes and L(i,j) is the shortest distance between nodes i and j, and wherein the summation is over all nodes j not being node i.

The method may include the step of determining that the location of the grid elements corresponding to the nodes of the set of nodes is persistent, or at least substantially persistent, between a plurality of datasets.

According to another aspect of the present invention, there is provided a method for predicting surface failure of a surface, the method comprising the steps of: obtaining a group of measured datasets, each including: a measurement value of at least a first type for each of a plurality of grid elements, each grid element associated with a location on the surface; and a time value, such that the group of datasets includes datasets associated with a plurality of unique time values, for each measured dataset, analysing the measurement values to identify one or more clusters of measured values and at least one outlier measured value not associated with a cluster, identifying an interface set of grid elements for each measured dataset, each interface set comprising grid elements of the associated measured dataset associated with outlier measurement values, and determining a risk of surface failure in accordance with identification of a pattern of grid elements of the interface set which has a persistent location with respect to the surface of interface sets over a plurality of measured datasets.

Optionally, the measurement values comprise movement values.

The measured datasets may be generated periodically or at least substantially periodically. For example, the datasets may be obtained with a period of less than 10 minutes, for example, every 6 or 7 minutes.

Optionally, the method further comprises the step of: generating an alert in response to determining the risk exceeds a predefined risk threshold.

The grid elements may be arranged in a regular grid. Alternatively, the grid elements may be arranged in an irregular grid.

The surface may be the surface of a mine, and the surface failure may correspond to a land slip.

Optionally, the method further comprises the step of generating a plurality of spatial synthetic datasets, wherein the step of identifying an interface set of grid elements for each measured dataset comprises analysing the one or more spatial synthetic datasets in addition to the measured datasets.

Optionally, the method further comprises the step of generating a plurality of temporal synthetic datasets, wherein the step of identifying an interface set of grid elements for each measured dataset comprises analysing the one or more temporal synthetic datasets in addition to the measured datasets.

Each measured dataset may include a measured value of at least one additional type for each of the plurality of grid elements.

According to another aspect of the present invention, there is provided a surface failure prediction system comprising: a measurement apparatus configured to: obtain a group of measured datasets, each including: a measurement value of at least a first type for each of a plurality of grid elements, each grid element associated with a location on the surface; and a time value, such that the group of datasets includes datasets associated with a plurality of unique time values, and a computing device configured to: identify an interface set of grid elements for each measured dataset, each interface set comprising grid elements of the associated measured dataset meeting a connection threshold according to a connection rule in dependence on the measurement values of the grid elements, determine a risk of surface failure in accordance with identification of a persistent location with respect to the surface of interface sets of a plurality of measured datasets.

According to another aspect of the present invention, there is provided a surface failure prediction system comprising: a measurement apparatus configured to: obtain a group of measured datasets, each including: a measurement value of at least a first type for each of a plurality of grid elements, each grid element associated with a location on the surface; and a time value, such that the group of datasets includes datasets associated with a plurality of unique time values, for each measured dataset, analyse the measured values to identify one or more clusters of grid elements based on a similarity between the respective measurement values and at least one outlier grid element not associated with a cluster, identify an interface set of grid elements for each measured dataset, each interface set comprising grid elements of the associated measured dataset associated with outlier grid elements, and determine a risk of surface failure in accordance with identification of a pattern of grid elements of the interface set which has a persistent location with respect to the surface of interface sets over a plurality of measured datasets.

The measurement apparatus may be a surface movement measurement apparatus.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
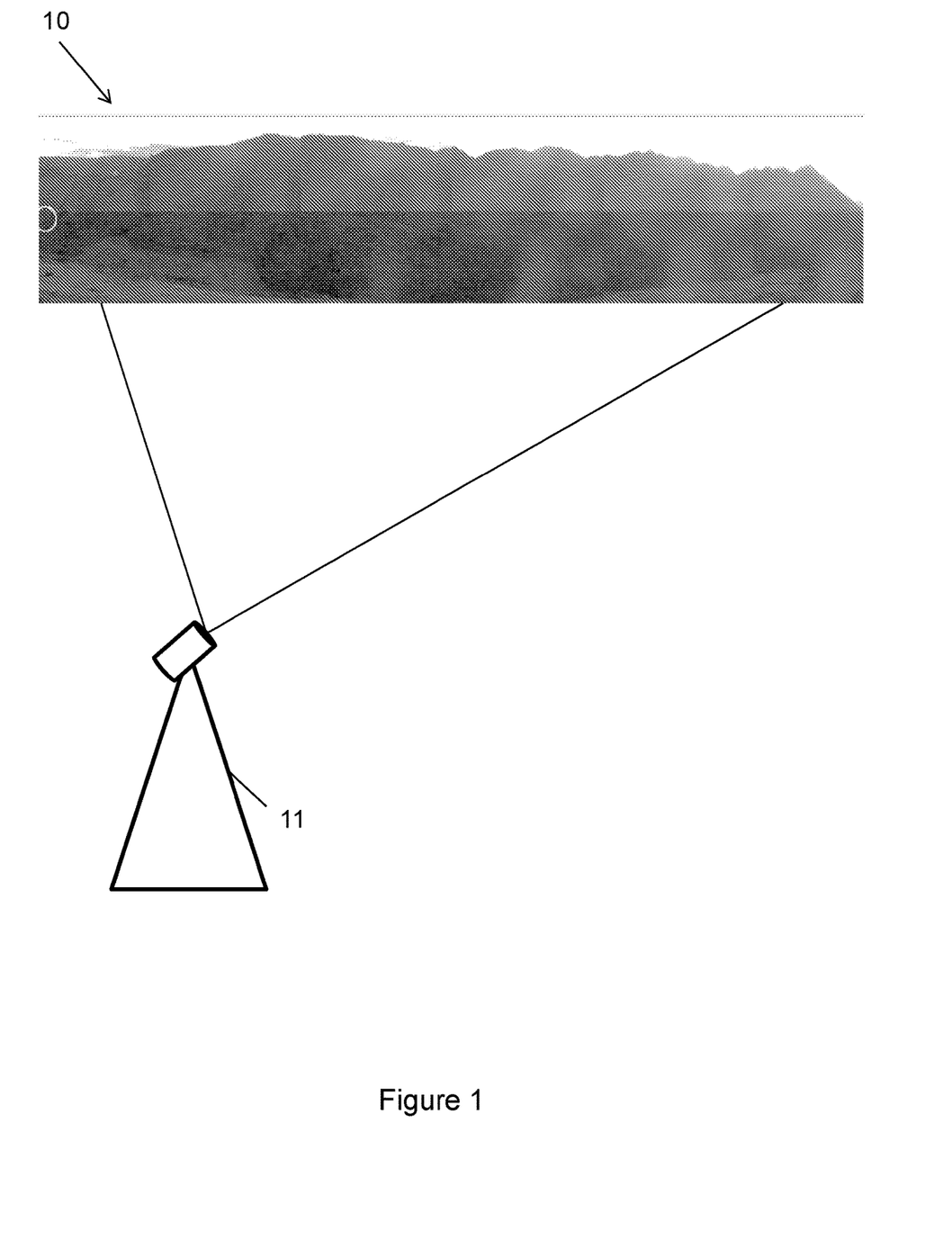
FIG. 1 shows a surface at risk of surface failure and a surface measurement apparatus.

Referring to FIG. 1, a surface 10 is shown (in this case, the surface may be a mine surface or cliff face). A surface measurement apparatus 11 makes regular measurements of movement of material of the surface 10. Typically, such measurements are periodic, and may have a period of less than 10 minutes, for example, 6-7 minutes. It is noted that any suitable period may be selected. Furthermore, in an embodiment, measurements are taken at irregular intervals.

Figure 2:
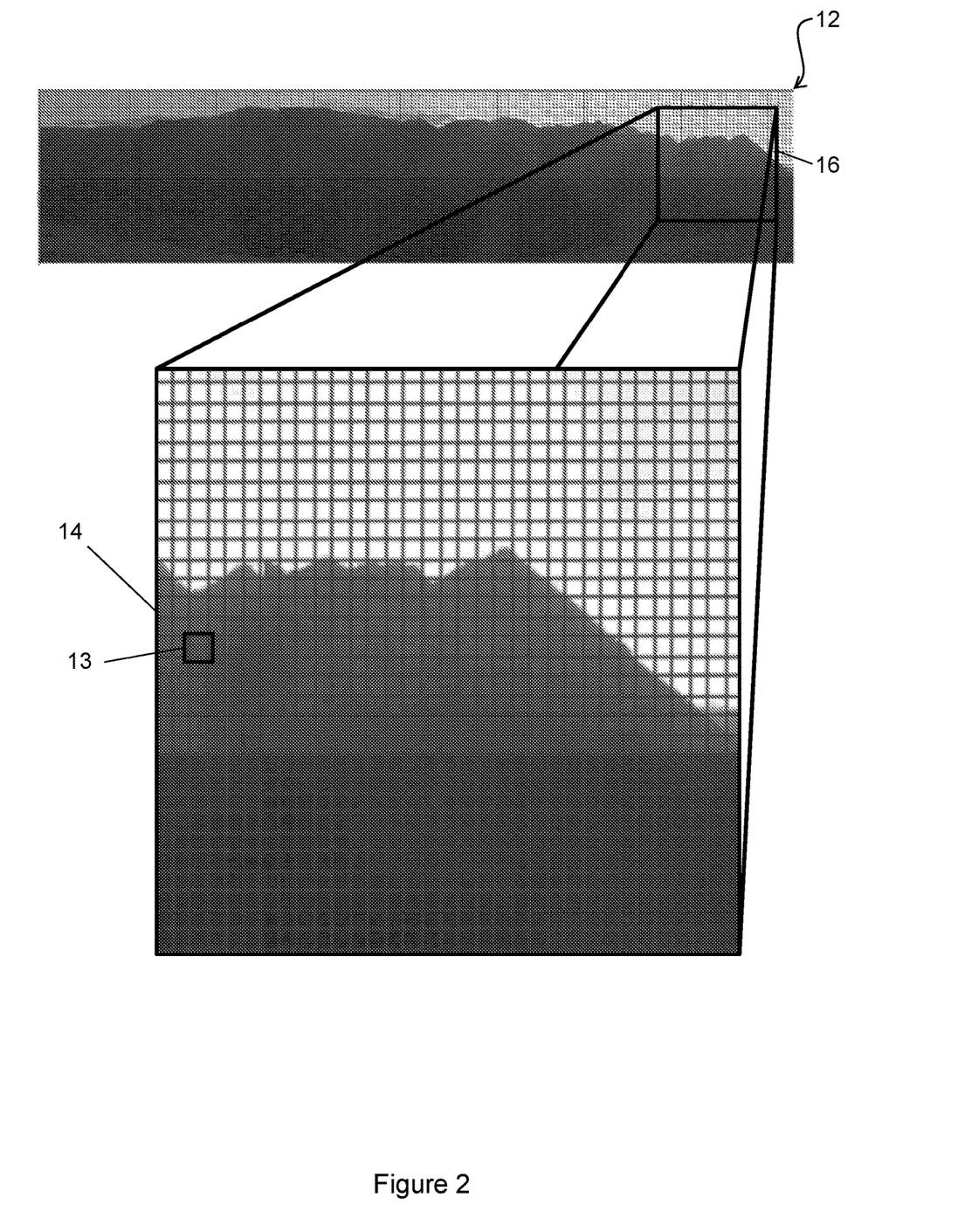
FIG. 2 shows a grid of grid elements applied to a representation of the surface.

Referring to FIG. 2, a grid 12 is associated with surface 10, the grid 12 comprising a plurality of grid elements 13 each associated with a portion of the surface 10. An enlarged image of portion 16 of the surface 10 is shown in insert 14. Although shown as a regular grid 12, in an alternative implementation an irregular grid 12 can be utilised. It may be that the relative position of the grid elements 13 with respect to the surface 10 is required to be consistent over time (or at least, any changes in relative positioning should be small). The grid elements 13 correspond to discrete measurement locations on the surface 10.

The surface measurement apparatus 11 generates information of the movement of material of the surface 10 with respect to each grid element 13. Therefore, for each measurement instance, each grid element 13 has a measurement value attributed to it comprising the measurement movement. The measurement value, in this case, indicates an amount of movement of material associated with the grid element. The measurement value may correspond to a displacement, and therefore include information of a direction of movement as well as a magnitude of movement. For the purposes of this disclosure, the measurement value does not comprise specific direction information for each grid element 13.

In an example, the surface measurement apparatus 11 is ground based and utilises radar directed towards the surface 10 to obtain the measurement values. More generally, the surface measurement apparatus 11 comprises any suitable apparatus for making movement measurements of a surface. For example, the surface measurement apparatus 11 may be airborne (e.g. utilising a drone) or in orbit (i.e. a satellite). The surface measurement apparatus 11 can utilise other measurement techniques instead of radar based.

Figure 3:
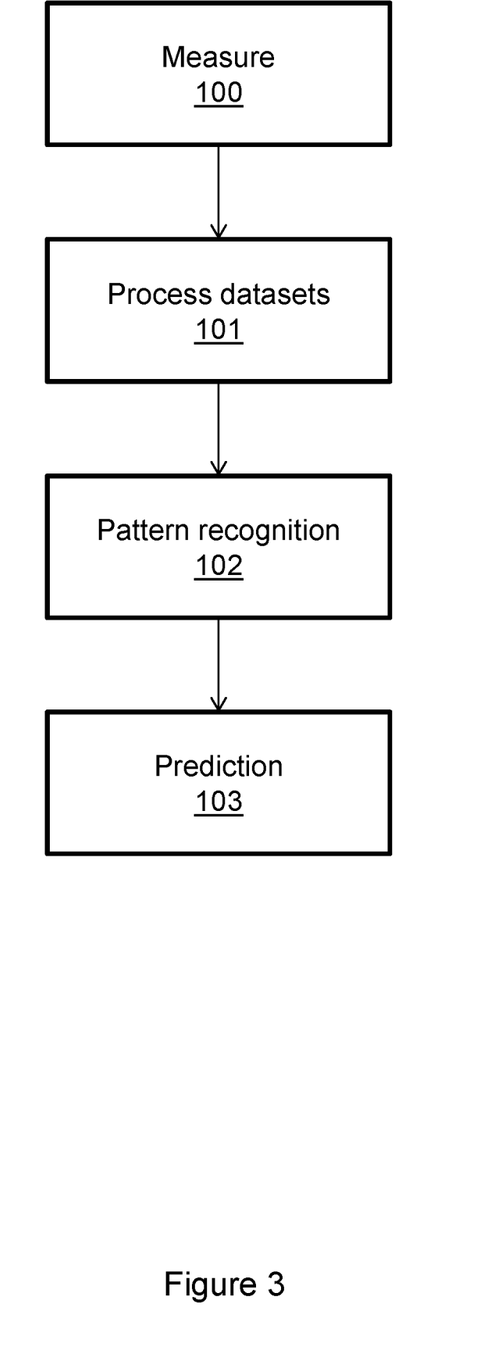
FIG. 3 shows a method for predicting surface failure of a surface.

FIG. 3 shows a method for predicting surface failure of a surface.

A group comprising a plurality of measured datasets is obtained at measurement step 100. Generally, the measured datasets are obtained sequentially, and are therefore separated in time. Each measured dataset is therefore associated with a unique time value. Furthermore, each measured dataset comprises measured measurement values for each of the grid elements 13.

Each measured dataset is processed at processing step 101 in order to identify potential clusters of measurement values and outlier measurement values. The clusters of measurement values are points in high-density regions of the state space of measurement values while outlier measurement values are points in relatively low-density regions of the state space of measurement values.

Figure 4:
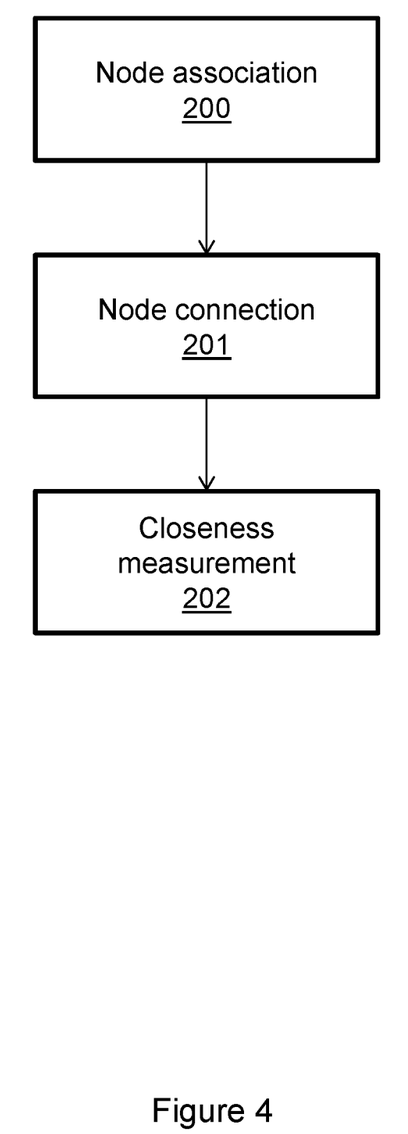
FIG. 4 shows a method for processing datasets according to an embodiment.

FIG. 4 shows a method for processing a particular measured dataset according to an embodiment. Each grid element 13 is associated with a node, at node association step 200. According to this method, each node is characterised by the measurement value associated with the corresponding grid element 13—for example, each node may be labelled with the measurement value.

Each node is then connected to 'k' other nodes (k≥2), in accordance with a connection rule, at node connection step 201. In the present embodiment, the node connection rule corresponds to determining the smallest value for k such that each node is connected to the same network (i.e. each node is connected to every other node, either directly or via one or more other nodes). In the present embodiment, a node is connected to k other nodes having the closest measurement values to the measurement value of the node. For example, for k=2, each node is connected to two other nodes, selected as the two nodes having measurement values closest to that of the selected node. For k=3, each node is connected to three other nodes with closest matching values.

In an example implementation, initially each node is connected to the two closest nodes in terms of associated measurement value, and then the network is tested for connectivity (here, "connectivity" means that each node is connected to each other node—there is only one network). If the network is connected, then the method proceeds with k=2. If the network is not connected, k is incremented by 1 (i.e. k=k+1), and the method repeated. Ultimately, the method continues with the value of k which first results in a connected network. The described method has the benefit of ensuring a connected network, while minimising the density of the connectivity of the network.

Generally, the particular rule for choice k may be selected by a system operator. Furthermore, it is envisaged that alternative connection rule may be utilised for creating the network. It can be preferred that the connection rule utilised preferentially connects nodes associated with similar measurement values (or, more similar). For example, according to an alternative, the requirement that k is constant for each node is not applied, and each node is therefore able to be connected to a variable number of other nodes.

Next, once the connected network is obtained, a "closeness centrality" ($C_c$) is determined for each node, at closeness measurement step 202. The closeness centrality is a measure of how closely a particular node is connected to all other nodes in the network. Generally, the method of identifying high closeness centrality nodes should effectively identify those nodes which are more closely connected to all other nodes in the network (a connection length between two nodes may be the length of a shortest path between the nodes). In an example implementation, the following formula is utilised to determine the closeness centrality for each node i:

$$C_c(i) = \frac{N-1}{\sum_{j \neq i} L(i,j)}$$

Here, N is the total number of nodes (and correspondingly, the total number of grid elements), i is the current node of interest, L(i,j) is a measure of the shortest path between the current node i and node j. The shortest path between i and each other node is summed. Therefore, the closeness centrality according to the example is larger for nodes more closely connected to all other nodes (i.e. that summation will take a smaller value). The above equation assumes that k is the minimal value allowing for a connected network, as previously described.

An interface set is created at step 203 for each measured dataset. The interface set comprises a plurality of grid elements meeting the connection threshold. A connection threshold is applied to each node (which, as described, is associated with a grid element) of a particular measured dataset, in order to identify nodes more closely connected to all other nodes. In an embodiment, the connection threshold corresponds to identifying a predetermined number of nodes being most closely connected to all other nodes, for example, between 10% and 30% of the total number of nodes, and preferably equal to, or close to, 20% of the total number of nodes. These identified nodes are then associated with the interface set. High closeness centrality may imply nodes which connect different clusters of nodes. A cluster of nodes represents areas of similar measurement values. Generally, the result of processing step 101 may be a group of measured datasets each associated with an interface set of grid elements.

Other embodiments are envisaged for identifying clusters of nodes and outlier nodes. In one example, a machine learning algorithm is employed configured to identify nodes (represented as points—that is, the nodes according to the example may not be connected) in high-density regions of the state space of measured values and, importantly, relatively low-density regions of the state space of measured values. Any other suitable method for identifying clusters and outliers may be employed. Clusters of nodes in the state space of measured values may be characterised by high "intra-similarities"—that is, the measurement values associated with the nodes within a single cluster are relatively similar to one another—and low "inter-similarities"—that is, the measurement values of nodes from different clusters are of relatively different values. Outlier nodes in the state space of measured values are those that comprise measurement values which are insufficiently similar to the values of any one of the identified clusters.

The method for identifying clusters of nodes and outlier nodes may be configured to identify a predetermined number of outlier nodes (for example, between 10% and 30% of the total number of nodes, and preferably equal to, or close to, 20% of the total number of nodes). Alternatively, the number of outlier nodes identified may vary in dependence on the particular set of measurement values.

When viewed in the context of the method described with reference to FIG. 4, the nodes meeting the connection threshold may be considered to be outlier nodes. Therefore, in a general sense, the outlier nodes can be considered to form the interface set.

Figure 5A:
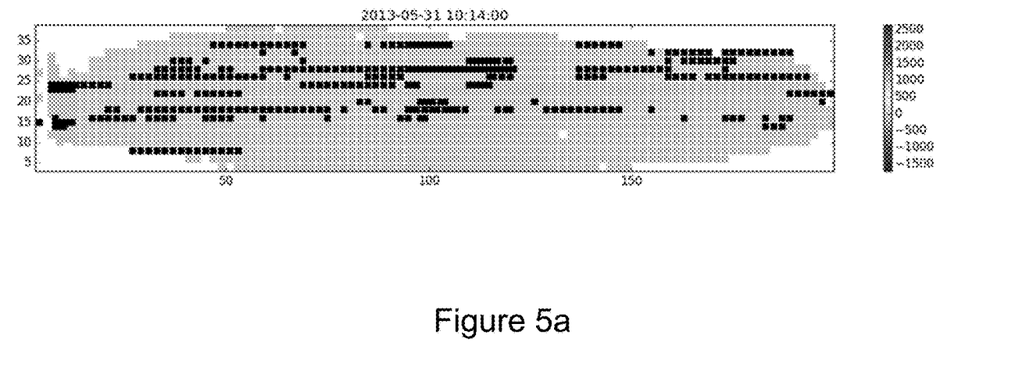
FIGS. 5a, 5b, and 5c show grid elements of an interface set for different datasets.
Figure 5B:
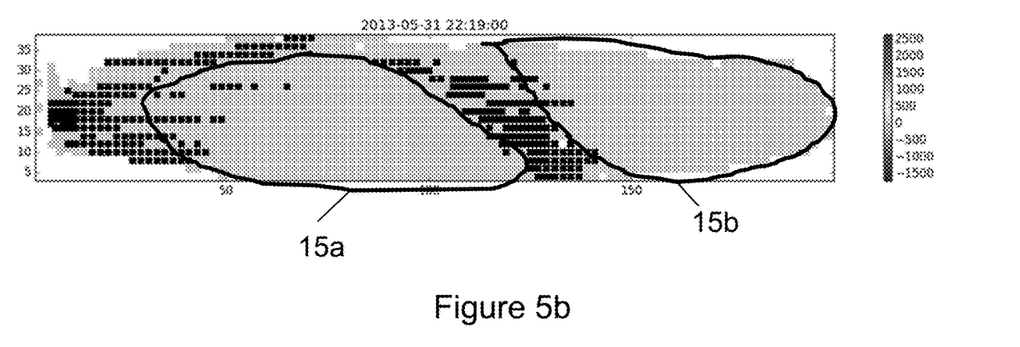
Figure 5C:
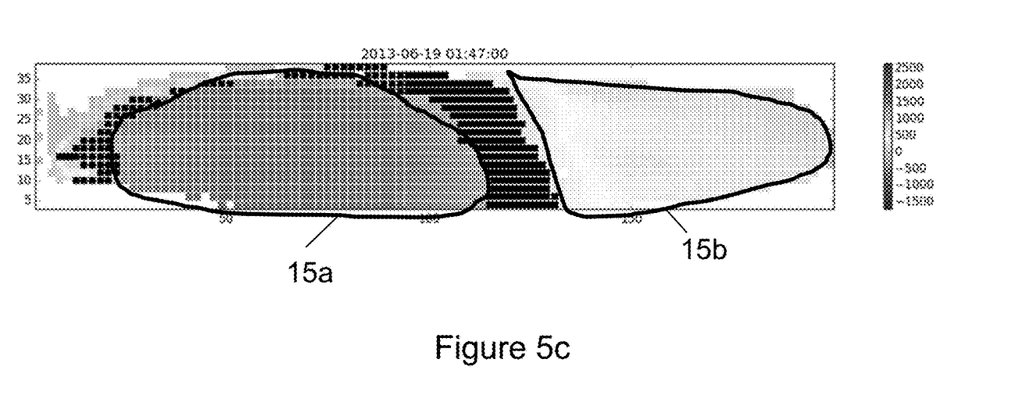

Referring to FIGS. 5a, 5b, and 5c, three examples are shown of a grid 12 of grid elements 13 of a surface 10. The example of FIG. 5a is of an earlier measurement of measurement values for each grid element 13. The measurement values of FIG. 5b for each grid element 13 were taken at a later point in time. The measurement values of FIG. 5c for each grid element 13 were taken at again a later point in time. In the case of FIG. 5c, a surface failure event has occurred. In each example, pixels are coloured black if the associated closeness centrality value is within the highest 20% of closeness centrality values over the entire grid 12. In an alternative embodiment, the pixels associated with outlier nodes are utilised (i.e. correspond to the pixels coloured black in the figures).

As can be seen, in the example of FIG. 5a, there is little to no obvious correlation between the locations of the black labelled grid elements 13. However, by the time of the example of FIG. 5b, an obvious correlation has emerged as to the locations of the black labelled grid elements 13, as shown by annotated regions 15a and 15b. Finally, at FIG. 5c, a surface failure event has occurred—in the example, this corresponds to a slip. As can be seen, there is a clear demarcation between the measurement values within region 15a and those within region 15b.

The present method is aimed at identifying a risk of a potential surface failure before surface failure occurs. In the examples, it is possible to conclude that a risk of a surface failure exists at the time of FIG. 5b (although, as discussed below, the method generally requires persistence of the grouping of interface grid elements 13 over a number of datasets). In effect, it can be determined that there is a correlation in the measurement values of grid elements 13 within region 15a and a separate correlation in the measurement values of grid elements 13 within region 15b.

According to an embodiment, a pattern recognition technique is utilised in order to identify a pattern in the physical location (i.e. the location within the grid 12) of the grid elements 13 of the interface set for each measured dataset, at pattern recognition step 102. A pattern may correspond, for example as shown in FIG. 5b, to a grouping on the surface 10 of grid elements 13 associated with the interface set. The grouping may not be required to include all grid elements 13 of the interface set.

The method proceeds to prediction step 103. The patterns identified in pattern recognition step 102 are examined in order to determine a risk of surface failure. Generally, patterns which are persistent over a number of measured datasets are preferred, as these indicate surface movements at the grid elements which are consistent. In particular, it is preferred that the identified pattern is persistent between consecutive (in time) measured datasets. A surface failure is likely where there is persistent cluster of grid elements 13 within the interface set. Contrastingly, where there is no obvious clustering (such as shown in FIG. 5a), there is a reduced chance of surface failure. In an embodiment, a risk of surface failure may be calculated. The risk may be dependent on the number of measured datasets for which a persistent pattern is identified. For example, the risk may increase with an increasing number of datasets having the persistent grouping of grid elements 13 in the interface set.

The method of FIG. 3 according to an embodiment is modified such that processing step 101 includes generating a plurality of candidate interface sets. A candidate interface set may be selected from the plurality of candidate interface sets as the interface set. It is to this selected interface set that the pattern recognition is applied. In an alternative implementation, a pattern common to one or more of the candidate interface sets is identified at pattern recognition step 102.

In the present embodiment, each candidate interface set corresponds to a unique number of most closely connected nodes. For example, one candidate interface set is associated with the top 10% most closely connected nodes, another with the top 20% most closely connected nodes, and yet another with the top 30% most closely connected nodes. In an implementation, there are a minimum number of nodes, such that the smallest candidate interface set has a number of nodes equal to the minimum number. Similarly, there are a maximum number of nodes, such that the largest candidate interface set has a number of nodes equal to the maximum number. Furthermore, in an implementation, there is a candidate interface set for each incremental number of nodes between the maximum number and minimum number (optionally including the maximum and minimum number).

According to an embodiment, each candidate interface set is analysed in order to select one of the candidate interface sets with a pattern of grid elements best matching a pattern associated with a risk of surface failure, although it is understood that at any one time the risk may be determined to be low or even non-existent.

In an embodiment, the method described with reference to FIG. 4 is combined with a method (or methods) for identifying clusters of nodes and outliers, as described above, thereby creating a plurality of preliminary interface sets which are combined to create the interface set (or a candidate interface set). The outliers in the different interface sets may be combined—this is particularly useful where each technique is more suitable to finding different outliers. Thus, a larger and/or more accurate interface set can be obtained. Alternatively, only common outliers between the interface sets are utilised for the resulting interface set. According to this embodiment, a technique using closeness centrality is combined with a pattern recognition technique.

The method of FIGS. 3 and 4 can be modified, in an embodiment, to utilise synthetic datasets. "Synthetic datasets" contain data obtained from pre-processing the measured datasets.

In an embodiment, a spatial synthetic dataset is generated by applying a spatial filter to one or more of the datasets. Each grid element 13 of a measured may be associated with a synthetic grid element of a synthetic data set. Each synthetic grid element is also created in dependence on a predetermined number of neighbouring grid elements 13 to the associated grid element 13. For example, an average measurement value is obtained, calculated by averaging the measurement value of the associated grid element 13 and its closest n neighbours (e.g. n=4 implies, for a rectangular grid 12, the grid elements 13 immediately above, below, and to either side, of the associated grid element 13).

The spatial synthetic datasets can be utilised when identifying connections between grid elements 13 (e.g. via step 201 of FIG. 4). For example, for each grid element 13, the associated measurement value may be replaced with a measurement vector, comprising the measurement value associated with the grid element 13 and one or more synthetic measurement values (each synthetic measurement value being determined based on a different synthetic rule). When determining the interface set associated with a grid element, the interface set is created comprising grid elements of the associated measured dataset meeting a connection threshold according to a connection rule in dependence on the measurement vector of the grid elements 13 (which is at least in part determined 1s based on the measurement value of the grid element 13). In an embodiment, this corresponds to each node associated with a grid element 13 being connected to its k nearest nodes based on similarity in measurement vector (using a known vector comparison technique).

In an embodiment, a temporal synthetic dataset is generated by applying a temporal filter to a plurality of the measured datasets. For example, a subset of the plurality of measured datasets are combined (e.g. through averaging measurement values or vectors, or by determining an overall displacement that has occurred between an earliest of the measured datasets and a latest of the measured datasets). This is typically undertaken a plurality of times, in order that each dataset is utilised in generation of at least one synthetic dataset. For example, a moving window may be applied to the datasets, with each synthetic dataset corresponding to a combination of a predetermined number of datasets within the window. In a related embodiment, synthetic datasets are created by interpolating between datasets, thereby creating an overall increase in the number of time intervals represented by the collection of datasets and synthetic datasets.

Pattern recognition step 102 is modified to identify patterns in both the measured datasets and the temporal synthetic datasets. These identified patters are examined in order to determine a risk of surface failure at prediction step 103. Generally, patterns which are persistent over a number of datasets and temporal synthetic datasets are identified, as these indicate surface movements at the grid elements 13 which are consistent. A surface failure is likely where there is a boundary between one region of grid elements consistently moving differently to grid elements in another region, and where those regions are also consistent. The synthetic datasets assist in providing additional information for use in prediction.

An embodiment utilises both spatial synthetic datasets and temporal synthetic datasets, as described herein.

In an embodiment, the measured datasets are pre-processed before identification of the interface set. For example, although embodiments herein are described utilising original measurement values of the measured datasets, it is understood that a pre-processing of these measurement values can be utilised. In one implementation, for each grid element 13, a probabilistic model is applied to the time series data associated with the grid element 13 (i.e. to the measured values for that grid element 13 for each measured dataset). The pre-processed measured values for each grid element 13 are then utilised in order to identify the interface set. This may advantageously improve subsequent pattern recognition.

The method of FIGS. 3 and 4 can be modified, in an embodiment, such that each measurement value is a vector (or other multivalued data structure) comprising D values. Generally, at least one of the D values comprises a non-movement value (generally, non-movement "measured values") obtained from various techniques. For example, each grid element 13 can additionally be associated with received rainfall (e.g. excessive rainfall may be correlated with an increased risk of surface failure) or, more generally, water content. Generally, if changes in a measurable property will tend to indicate a risk of surface failure, then the measurable property may be suitable for use. The suitability of a particular measurable property for use may be determined, for example, through analysis of existing datasets where it is known that a surface failure occurred. If each grid element has a total of D measurement values, then the state space of measurement values is the D-dimensional Euclidean space in which the variables on the axes are the measurement values. In this state space, each grid element is associated with a point whose coordinates correspond to the measurement values of the grid element 13.

According to an embodiment, the similarity of nodes is calculated in dependence on each of the measurement values (movement and/or non-movement) associated with each node. For example, two nodes with similar movement measurement values but different non-movement measurement values may not be considered as similar as two nodes with similar movement and non-movement values. Different properties may be weighted—for example, movement values may be found to provide a stronger correlation to subsequent surface failure than rainfall and are thus given more weight when determining clusters of nodes and outlier nodes.

Figure 6:
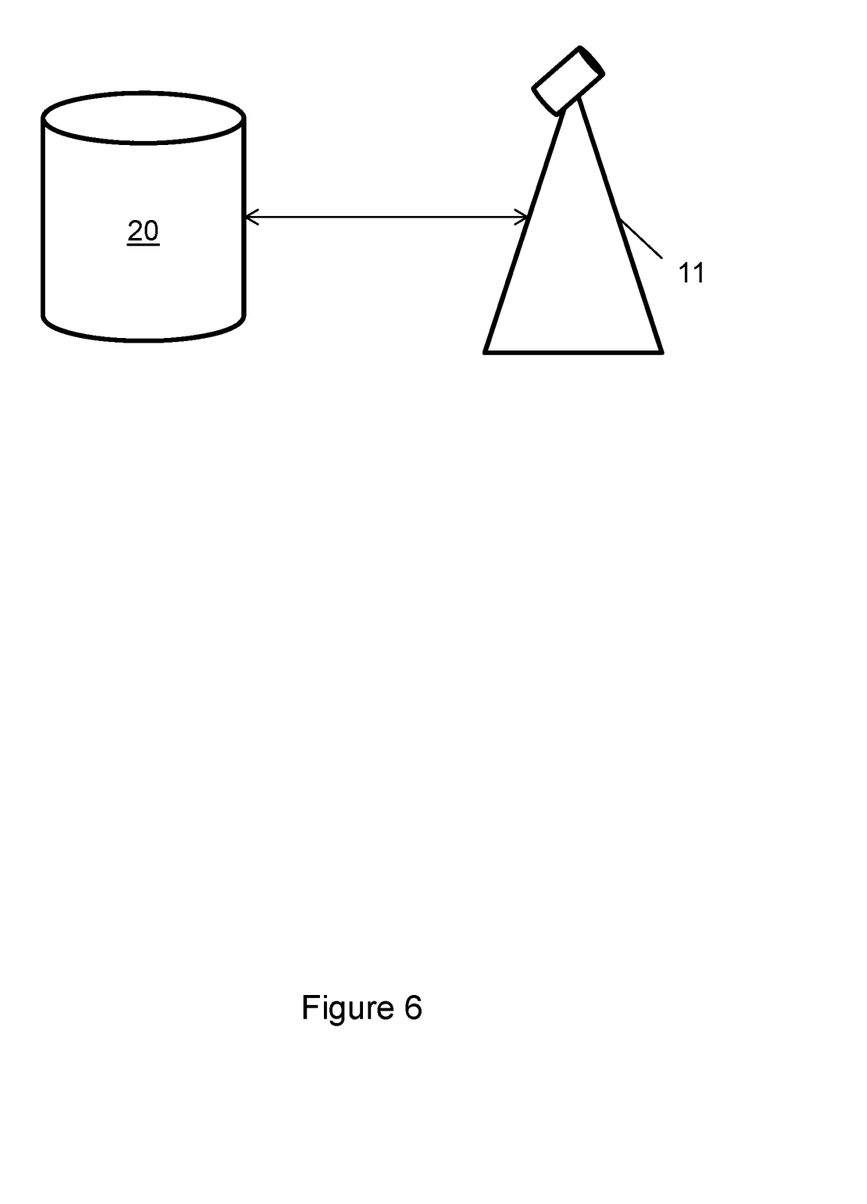
FIG. 6 shows a prediction system according to an embodiment.

FIG. 6 shows a prediction system according to an embodiment. A computing device being a prediction server 20 is interfaced with a surface measurement apparatus 11. The prediction server 20 receives surface measurements made by the surface measurement apparatus 11. The predictions server 20 can receive the surface measurements in the form of time-stamped datasets (i.e. each dataset is associated with a time at which the dataset was acquired). The prediction server 20 can receive the datasets via a serial data connection, a wired and/or wireless network data connection, through transfer via storage media (such as a USB storage drive or SD Card), or any other suitable data transfer mechanism. The prediction server 20 may receive each dataset substantially immediately after the surface measurements are obtained, or delayed. For example, datasets may be transferred to the prediction server 20 in batches.

The prediction server 20 is configured, either in an automatic or user initiated manner, to analyse the datasets in order to determine a risk of surface failure. The prediction server 20 may comprise a standalone computer, an interlinked plurality of computers, a server farm such as provided by a cloud server provider, dedicated processing equipment, or any other suitable hardware. Generally, the prediction server 20 is configured to implement the methods described herein.

In an embodiment, the prediction server 20 is configured to cause generation of an alert in response to determination of a risk of surface failure. Typically, in this embodiment, the risk must be greater than a predefined risk threshold for an alert to be generated. There may be multiple predefined risk threshold levels, with each associated with a different alert. The prediction server 20 may be operable by a user, and the alert is presented to the user via a user interface (such as a graphical user interface). Typically, the predetermined risk threshold (or levels) is set by a user.

Further modifications can be made without departing from the spirit and scope of the specification. For example, the order of certain method steps may be changed.

The invention claimed is:

1. A method for predicting surface failure of a surface, the method comprising the steps of:
   obtaining a group of measured datasets, each including: a measurement value of at least a first type for each of a plurality of grid elements, each grid element associated with a location on the surface; and a time value, such that the group of datasets includes datasets associated with a plurality of unique time values,
   for each measured dataset:
      constructing a network of nodes in a state space of the measurement values, wherein each node is uniquely associated with a grid element, wherein the network of nodes enables, for a selected node, a determination of a connectedness of said selected node within said state space to all other nodes of the network of nodes; and
      identifying an interface set of grid elements comprising a subset of the grid elements of the measured dataset corresponding to the grid elements meeting a connection threshold according to a connection rule in dependence on the measurement values of the grid elements, wherein the connection threshold defines a minimum connectedness to all other grid elements, and
   determining a risk of surface failure in accordance with identification of a pattern defined by the locations of the grid elements of the interface sets which has a persistent location with respect to the surface over a plurality of measured datasets, such that the pattern has the persistent location over a period of time.

2. A method as claimed in claim 1, further comprising the steps of:
   assigning a connection to every pair of nodes meeting a connection criterion, wherein the connection criterion defines a required closeness of the measurement values of the pair of nodes in order for the pair to be assigned the connection, wherein the grid elements of the interface set of grid elements are determined in accordance with identification of a set of nodes having a closest connection to all other nodes.

3. A method as claimed in claim 2, wherein the step of constructing a network of nodes includes:

connecting each node to k other nodes in accordance with a node connection rule on the basis of a closeness in measurement value between the node to the k other nodes, wherein k is selected in accordance with a minimum number of connections for each node that provides a connected network.

4. A method as claimed in claim 3, wherein the step of constructing a network of nodes further includes:

determining, for each node, a closeness centrality for the node; and identifying a predetermined number of nodes for the set of nodes having largest closeness centralities.

5. A method as claimed in claim 4, wherein the predetermined number is between 10% and 30% of the total number of nodes.

6. A method as claimed in claim 4, wherein the step of constructing a network of nodes further includes:

generating a plurality of candidate interface sets, wherein the interface set is selected from one of the plurality of candidate interface sets.

7. A method as claimed in claim 4, wherein, for each nodes i, the closeness centrality $C_c$ is determined according to the following equation:

$$C_c(i) = \frac{N-1}{\sum_{j \neq i} L(i, j)}$$

where N is the total number of nodes and L(i,j) is the shortest distance between nodes i and j, and wherein the summation is over all nodes j not being node i.

8. A method as claimed in claim 1, wherein the measurement values comprise movement values.

9. A method as claimed in claim 1, wherein the measured datasets are generated periodically or at least substantially periodically.

10. A method as claimed in claim 1, further comprising the step of: generating an alert in response to determining the risk exceeds a predefined risk threshold.

11. A method as claimed in claim 1, further comprising the step of generating a plurality of spatial synthetic datasets, wherein the step of identifying an interface set of grid elements for each measured dataset comprises analyzing the one or more spatial synthetic datasets in addition to the measured datasets.

12. A method as claimed in claim 1, further comprising the step of generating a plurality of temporal synthetic datasets, wherein the step of identifying an interface set of grid elements for each measured dataset comprises analyzing the one or more temporal synthetic datasets in addition to the measured datasets.

13. A method for predicting surface failure of a surface, the method comprising the steps of:

obtaining a group of measured datasets, each including: a measurement value of at least a first type for each of a plurality of grid elements, each grid element associated with a location on the surface; and a time value, such that the group of datasets includes datasets associated with a plurality of unique time values, for each measured dataset, analysing the measurement values to identify one or more clusters of measured values and at least one outlier measured value not associated with a cluster, wherein the, or each, cluster represents a plurality of grid elements having similar measurement values according to a predefined criterion to one another and wherein the remaining grid elements not associated with a cluster are identified to be outliers, identifying an interface set of grid elements for each measured dataset, each interface set comprising a subset of the grid elements of the associated measured dataset corresponding to the grid elements identified as outliers, and determining a risk of surface failure in accordance with identification of a pattern defined by the locations of the grid elements of the interface sets which has a persistent location with respect to the surface over a plurality of measured datasets, such that the pattern has the persistent location over a period of time.

14. A method as claimed in claim 13, wherein the measurement values comprise movement values.

15. A method as claimed in claim 13, wherein the measured datasets are generated periodically or at least substantially periodically.

16. A method as claimed in claim 13, further comprising the step of: generating an alert in response to determining the risk exceeds a predefined risk threshold.

17. A method as claimed in claim 13, further comprising the step of generating a plurality of spatial synthetic datasets, wherein the step of identifying an interface set of grid elements for each measured dataset comprises analyzing the one or more spatial synthetic datasets in addition to the measured datasets.

18. A method as claimed in claim 13, further comprising the step of generating a plurality of temporal synthetic datasets, wherein the step of identifying an interface set of grid elements for each measured dataset comprises analyzing the one or more temporal synthetic datasets in addition to the measured datasets.

19. A surface failure prediction system comprising:

a measurement apparatus configured to:

obtain a group of measured datasets, each including: a measurement value of at least a first type for each of a plurality of grid elements, each grid element associated with a location on the surface; and a time value, such that the group of datasets includes datasets associated with a plurality of unique time values, and a computing device configured to:

for each measured dataset:

construct a network of nodes in a state space of the measurement values, wherein each node is uniquely associated with a grid element, wherein the network of nodes enables, for a selected node, a determination of a connectedness of said selected node within said state space to all other nodes of the network of nodes; and identify an interface set of grid elements comprising a subset of the grid elements of the associated measured dataset corresponding to the grid elements meeting a connection threshold according to a connection rule in dependence on the measurement values of the grid elements, wherein the connection threshold defines a minimum connectedness to all other grid elements, and determine a risk of surface failure in accordance with identification of a pattern defined by the locations of the grid elements of the interface sets which has a persistent location with respect to the surface over a plurality of measured datasets, such that the pattern has the persistent location over a period of time.

20. A surface failure prediction system comprising:

a measurement apparatus configured to:

obtain a group of measured datasets, each including: a measurement value of at least a first type for each of a plurality of grid elements, each grid element associated with a location on the surface; and a time value, such that the group of datasets includes datasets associated with a plurality of unique time values, for each measured dataset, analyse the measured values to identify one or more clusters of grid elements based on a similarity between the respective measurement values and at least one outlier grid element not associated with a cluster, wherein the, or each, cluster represents grid element having similar measurement values according to a predefined criterion and wherein the remaining grid elements are identified to be outliers, identify an interface set of grid elements for each measured dataset, each interface set comprising grid elements of the associated measured dataset corresponding to the grid elements identified as outliers, and determine a risk of surface failure in accordance with identification of a pattern defined by the locations of the of grid elements of the interface sets which has a persistent location with respect to the surface over a plurality of measured datasets, such that the pattern has the persistent location over a period of time.

* * * * *